Jan. 29, 1935.    J. E. KLINE    1,989,598
OIL FILTER AND COOLER
Filed April 2, 1934
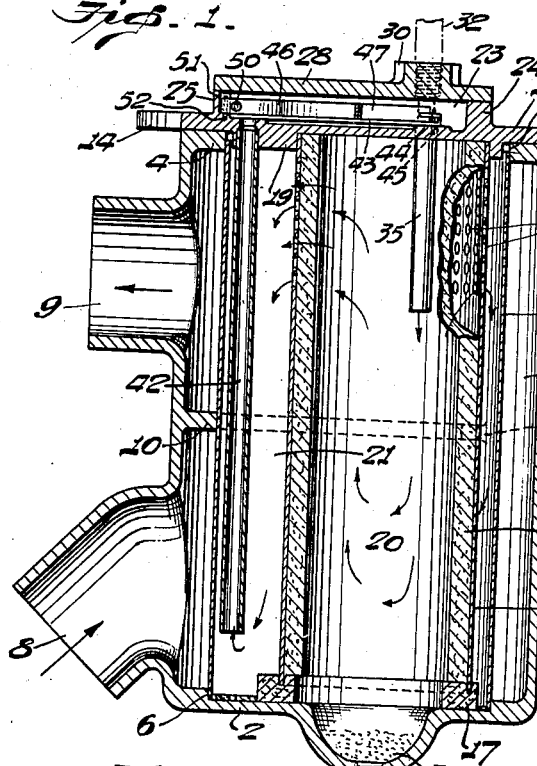
INVENTOR
Joseph E. Kline
BY
ATTORNEYS Patented Jan. 29, 1935

1,989,598

UNITED STATES PATENT OFFICE 1,989,598

OIL FILTER AND COOLER

Joseph E. Kline, Alpena, Mich.

Application April 2, 1934, Serial No. 718,698

7 Claims. (Cl. 184—104)

This invention relates to oil filters and coolers wherein lubricating oil is filtered and cooled after having passed through the bearings which it lubricates and before being again applied thereto.

The object of this invention is to provide a device of the class mentioned which shall filter and cool the oil from an engine or bearings so that the same shall be returned to the parts to be lubricated, at the temperature for greatest efficiency.

A further object of the invention is to provide in an oil filtering and cooling device, means controlled by the temperature of the oil discharged therefrom, for maintaining the oil at the desired temperature and viscosity.

A further object of this invention is to provide a device of the character mentioned, which may be adjusted or regulated according to the season and the viscosity of the oil, to deliver an output of oil in a condition of maximum efficiency for the condition under which the engine or bearings are being operated.

Other objects will appear hereinafter.

With these objects in view my invention consists generally in an oil cooling and filtering device comprising a hot oil receiving chamber and an oil cooling chamber connected adjacent their upper ends by a passageway for the hot oil from the first mentioned chamber to the cooling chamber, filtering means covering said passageway, an inlet for hot oil to the hot oil chamber, a valve chamber, a discharge conduit for the conditioned oil communicating with the valve chamber, a pair of inlet ports in said chamber, one port communicating with the upper end of the cooling chamber and the other with the lower portion thereof so as to deliver hot and cool oil respectively therethrough, and a valve in said chamber arranged to uncover and cover said ports simultaneously proportionately to the temperature of the oil in the valve chamber, so as to admit the proper proportions of hot and cooled oil to the valve chamber whereby the resultant mixture shall be of the desired temperature.

My invention further consists in a device as mentioned in which the inlet ports to the valve chamber have a common valve seat and in which the valve comprises an oscillatory member movable over the seat to uncover and cover the ports simultaneously proportionately to the temperature of the oil being delivered.

The invention further consists in a device as mentioned in which the valve is actuated by a thermostat, and the thermostat arranged in relation to said valve so as to maintain the valve upon the valve seat.

My invention further consists in an oil cooling and filtering device as mentioned in which the inlet valve ports and the discharge are so arranged with relation to the valve and thermostat that the oil from the inlet ports shall be maintained in contact with the thermostat as it passes to the discharge so that the thermostat and valve shall be quickly responsive to the temperature of the oil being discharged.

My invention further consists in various details of construction and arrangements of parts all as will be fully described hereinafter and particularly pointed out in the claims.

My invention will be more readily understood by reference to the accompanying drawing forming a part of this specification and in which—

Figure 1 is a vertical section of a filter and cooler embodying my invention, the same being taken on substantially the line 1—1 of Fig. 2, Fig. 2 is a plan view of the device, a portion being removed to illustrate the thermostatic control, Fig. 3 is a detailed section on the line 3—3 of Fig. 2, illustrated upon an enlarged scale, Fig. 4 is a similar section on the line 4—4 of Fig. 2, Fig. 5 is a perspective view of the valve member, and Fig. 6 is a perspective view of the thermostatic actuator for the valve.

Referring now to the drawing, 1 indicates the outer shell or housing of the device which is provided with a bottom 2, and having an opening 3 in its upper end, said opening being defined by an inwardly extending annular flange 4. A non-corrosive tubular member 5 is arranged within the casing and extends from top to bottom thereof, being brazed or otherwise secured to the flange 4 and to an annular shoulder 6 formed on the bottom 2. The shoulder 6 and flange 4 space the member 5 from the housing 1, forming a cooling water jacket 7.

The housing is provided with an inlet 8 and a discharge outlet 9 for admitting and discharging cool water to and from the jacket 7; and arranged between the inlet and outlet is a horizontal baffle 10. The baffle 10 is provided with an opening 11, preferably diametrically opposite the inlet and outlet, to permit the water which enters at 8 to pass to the outlet 9. The upper end of the casing is closed by a top plate 12, secured thereto as by screws 13; and said plate is preferably formed with a lateral extension 14 having apertures 15 to receive bolts or other fastening means (not shown) for securing the device in position.

Fixed to the top plate 12, and depending therefrom, is a filter retaining tubular member 16 which extends substantially to the bottom of the housing and seats upon an annular gasket 17 resting on the bottom. The gasket 17 prevents unfiltered oil from passing under the lower end of member 16. Arranged within the member 16 is a filtering medium 18 which is co-extensive with the member 16 and is of suitable heat resisting material, such as felt or hair. The retaining member 16 and the filtering medium 18 are held in position by an annular depending boss 19 formed on the lower face of the cover plate 12. This boss fits within the upper end of the member 5, and said retaining member 16 rests against and is secured to the inner face of said boss.

The retaining wall of member 16 and filter 18 forms a receiving chamber 20 for the hot oil as it is pumped from the engine or bearings; and the space between said retaining wall and the tubular member 5 constitutes an oil reservoir and cooling chamber 21. The upper end of the retaining wall 16 is provided with perforations 22 forming passages for the hot oil from the top of the receiving chamber 20 to the cooling chamber 21. The material 18 not only serves as a filter but constitutes an heat insulation between the receiving and cooling chambers.

On the upper face of the top plate 12 is a valve chamber 23 defined by end walls 24 and 25 respectively and side walls 26 and 27, and closed by a plate 28 secured in position in any suitable manner, as by screws 29. The closure plate 28 is provided with upwardly extending bosses 30 and 31 to receive the ends of an inlet pipe 32 and a discharge pipe 33 respectively.

The pipe 32 is for the hot oil from the pump (not shown) to the filter and cooler, whereas the discharge pipe is in communication with one end of the valve chamber 23 and leads to the bearings to be lubricated. The side wall 26 of the valve casing is enlarged under the boss 30, as at 34, and fixed therein is an oil inlet conduit 35, communicating with the pipe 32 and projecting into the receiving chamber 20 to a point below the lowermost perforations 22. The oil entering through the conduit 35 under pressure, is forced downwardly as indicated by the arrows in Fig. 1, and then rises, the hotter oil, of course, rising to the top; and is then forced through the filtering material and perforations 22 into the cooling chamber or reservoir 21. While the oil is passing through the chamber 20, it drops the denser impurities to the bottom 2. 36 indicates a sump formed in the bottom 2 of the receiving chamber into which the impurities settle, and 37 is a drain outlet for the same normally closed by a plug 38.

The receiving chamber 20 is arranged eccentrically within the cooling chamber, being positioned toward the side remote from the water inlet and outlet ports 8 and 9, thus bringing the largest part of the cooling chamber on the side with said inlet and outlet.

The opposite end of the valve chamber 23 from that with which the pipe 33 is in communication, is arranged over this larger portion of the cooling chamber and is provided with a transversely arranged valve seat 39 elevated slightly above the level of the bottom of said chamber. Said valve seat is provided with a pair of spaced inlet ports 40 and 41 for hot and cool oil respectively from the cooling reservoir 21. The port 40 extends through the top plate 12 and boss 19 and receives the hottest oil from the top of the reservoir or cooling chamber; whereas the port 41 communicates with a cooled oil conduit 42, which extends to near the bottom of the cooling chamber, and in close proximity to the inlet port 8, so that the oil rising through the conduit 42 to the port 41 is the coolest oil in the device.

The oil which enters the valve chamber 23 through the ports 40 and 41 passes longitudinally through the said chamber to the discharge pipe 33. A prime object of this invention is to maintain the oil discharged through the tube 33 in a proper condition for most efficient lubrication; and to this end, means are provided for maintaining the discharged oil at a uniform temperature which is regulated according to the viscosity of the oil and the weather conditions.

The heavier the oil or the colder the weather, the higher the temperature of the discharged oil should be; whereas, with a thin oil or in hot weather the temperature should be lower. In order to maintain this temperature constant, I provide means for automatically regulating the ratio of discharge of hot and cold oil through the ducts 40 and 41. To this end, an oscillating valve 43 and a thermostatic actuator for the same are provided. The valve 43 comprises a flat strip pivotally mounted at 44 on a fulcrum pin 45 adjacent the discharge end of the valve chamber 23, and having its free end resting on the valve seat 39. The end of the strip which rests upon the valve seat is of sufficient width to cover one of the inlet ducts 40 or 41 and extend to the periphery of the other, so that any lateral movement will partially uncover one port and at the same time correspondingly cover a substantially equal portion of the other port. It is obvious that by varying the position of the valve over said ports, the proportionate quantities of hot and cool oil permitted to enter the valve chamber are regulated, so that the mixture of the two will result in the desired temperature of the oil as it is discharged from the device.

In order to actuate the valve, a suitable thermostat 45' is provided. This comprises a pair of curved arms 46 and 47 respectively, each formed of two strips of metal secured together throughout their lengths and having different coefficients of expansion; the strips 48 of the greater coefficients of expansion being arranged on the inner or adjacent faces of the arms, and the strips 49 of the lesser coefficient of expansion being on the outer side. The arms 46 and 47 are riveted together adjacent one end as at 50 and these connected ends are seated in a recess 51 formed in the end wall 25 of the valve chamber, and are held therein by a pin 52, for reasons which will appear hereinafter. The opposite end of the arm 46 is bifurcated, forming a yoke 53 which engages a circumferential groove 54 in a screw 55 threaded through the wall 27. The end of the valve strip 43, adjacent the fulcrum 44 is bent upwardly as at 56 and then inwardly forming a short arm 57 above and parallel with the body of the strip. This arm extends inwardly beyond the fulcrum 44 and is notched as at 58 to receive the end of the arm 47 of the thermostat, said arm 47 being shorter than the arm 46 as shown in Figs. 2 and 6 of the drawing. It is obvious that according to the termperature of the oil in the chamber, the arms 46 and 47 will be flexed and in so doing, will move the valve 43 to regulate the proportionate discharge of hot and cool oils from the ports 40 and 41. When the temperature of the oil rises in the chamber, the thermostat will expand so as to move the valve 43 to close more or less the port 40 for the hot oil, and open the port 41 for the cool oil. If the oil cools below the desired temperature, the thermostat will tend to straighten and move the valve back, closing more or less the cool oil port and opening the hot oil port correspondingly. It will be noted therefore, that the temperature of the oil, and its consequent viscosity will be controlled automatically by the temperature of the oil as it passes from the filter and cooler to the discharge conduit 33.

The thermostat is arranged above the valve so that the arm 47 rests edgewise upon the same substantially throughout its length and with sufficient pressure to hold the valve to its seat against the pressure of the oil entering through the inlet ports 40 and 41, but without sufficient friction to interfere with the free oscillation of the valve. This is accomplished by having the end of the thermostat arranged in the recess 51 and secured by the pin 52. This connection also prevents dislodgment of the thermostat and thereby maintains a constant relation between the thermostat and the valve arm 57 and adjusting screw 55. By turning the screw 55, the bifurcated end of the thermostat arm 46 is moved inwardly or outwardly to initially set the device to maintain the desired temperature of the discharged oil. Should the oil be too viscous, due to the weather being cold or the oil too heavy, the screw is retracted so that the valve will not begin to close the hot oil port 40 until the temperature of the oil is increased. Under opposite conditions, the screw is moved inwardly, making the device more quickly responsive to a rise in temperature and thereby cutting off more of the hot thin oil and admitting more cool and viscous oil.

It is believed that the operation of the device will be clear from the foregoing description.

While it is to be understood that the oil filter and cooler provided by the present invention may be used in connection with engines or bearings of various kinds, it is especially suitable for use in connection with internal combustion engines as used in automobiles in which case the oil inlet 32 may be connected by suitable piping to the oil circulating pump as usually employed in the lubricating systems of such engines to receive hot oil therefrom and the oil outlet 33 may be connected by suitable piping to the bearings of the engines to be lubricated, and the water inlet 8 may be connected by a hose or other suitable means to the lower portion of the water circulating system of the engine or to the water circuluating pump thereof to receive cool water therefrom and the water outlet 9 may be connected by a hose or the like to the upper portion of the water circulating system of the engine to discharge water thereto from the filter and cooler.

I claim:

1. In an oil filter and cooler, a hot oil receiving chamber, an inlet thereto for hot oil, a cooling oil chamber, a passageway connecting said chambers, and means associated with said passageway for filtering the oil; in combination with a valve chamber, inlet ports in said valve chamber in communication with the upper and lower portions of said cooling oil chamber respectively, a valve controlling said ports, a thermostat in said valve chamber for actuating said valve, and a discharge duct leading from said valve chamber.

2. In an oil filter and cooler, a hot oil receiving chamber, an inlet thereto for hot oil, a cooling oil chamber, a passageway connecting said chambers and means associated with said passageway for filtering the oil; in combination with a valve chamber, a pair of inlet ports in said valve chamber in communication with the upper and lower portions of said cooling oil chamber respectively, said inlet ports being arranged adjacent each other and having a common valve seat, a valve movable on said seat to open one port as it closes the other port, the opening of one port being substantially proportional to the closing of the other port, a thermostat in said valve chamber for actuating said valve, and a discharge duct leading from said valve chamber.

3. A device as set forth in claim 2 in which the inlet ducts are arranged adjacent one end of the valve chamber and the discharge conduit at the opposite end of the chamber, and the thermostat being arranged in the passageway of the oil from said ports to said discharge duct, substantially as described.

4. A device as set forth in claim 2 in which the valve comprises an elongated member arranged longitudinally of the valve chamber, and pivotally mounted at one end, the free end being adapted to oscillate on said valve seat to control said inlet ports, and the thermostat including an arm adapted to be flexed by a variation of temperature in said chamber to actuate said valve, said arm being arranged to maintain said valve upon its seat, substantially as described.

5. In an oil filter and cooler, a hot oil receiving chamber, an inlet thereto for hot oil, a cooling oil chamber, a passageway connecting said chambers and means associated with said passageway for filtering the oil; in combination with a valve chamber, a pair of inlet ports in said valve chamber in communication with the upper and lower portions of said cooling oil chamber respectively, said inlet ports being arranged adjacent each other and having a common valve seat, a valve comprising an elongated member arranged longitudinally of the valve chamber and pivotally mounted at one end, the free end being adapted to oscillate on the valve seat to control the inlet ports, the pivoted end of the valve having a comparatively short inwardly turned arm provided with a notch in its end, and a thermostat comprising a pair of curved arms, each arm formed of two strips of metal having different coefficients of expansion, said arms being secured together at one end and said end being secured in fixed position in the valve chamber, the free end of one arm engaging the notch in the end of the arm of the valve, and means for holding the free end of the other arm of the thermostat, substantially as described.

6. In an oil filter and cooler, a hot oil receiving chamber, an inlet thereto for hot oil, a cooling oil chamber, a passageway connecting said chambers and means associated with said passageway for filtering the oil; in combination with a valve chamber, a pair of inlet ports in said valve chamber in communication with the upper and lower portions of said cooling oil chamber respectively, said inlet portions being arranged adjacent each other and having a common valve seat, a valve comprising an elongated member arranged longitudinally of the valve chamber and pivotally mounted at one end, the free end adapted to oscillate on the valve seat to control the inlet ports, the pivoted end of the valve having a comparatively short inwardly turned arm provided with a notch on its end, and a thermostat comprising a pair of curved arms, each arm formed of two strips of metal having different coefficients of expansion, said arms being secured together at one end and said end being secured in fixed position in the valve chamber, the free end of one arm engaging the notch in the end of the arm of the valve, and adjustable means for holding the free end of the other arm, said means comprising a screw threaded through the wall of said valve chamber and having an annular groove adjacent its inner end, and the end of the thermostat arm being bifurcated to engage said groove, substantially as described.

7. In a filtering and cooling device, a cooling oil chamber, a hot oil receiving chamber arranged eccentrically within the cooling chamber, an inlet to the hot oil receiving chamber, a passageway connecting said chambers adjacent their upper ends, and means associated with said passageway for filtering the oil; and a plate closing the upper ends of said chambers; in combination with a valve chamber arranged on said plate, inlet ports in said valve chamber arranged over the widest portion of said cooling chamber, said ports being in communication with the upper and lower portions of said chamber respectively, an oscillatory valve controlling said ports, a thermostat for actuating said valve, a discharge duct from said valve chamber, and a water jacket surrounding said cooling chamber and having an inlet and an outlet for the cooling water arranged on the side adjacent the widest portion of the cooling chamber, substantially as described.

JOSEPH E. KLINE.